F. T. Thurston,
Skate.

Nº 83,339.   Patented Oct. 20, 1868.

F. T. THURSTON, OF PROVIDENCE, RHODE ISLAND.

Letters Patent No. 83,339, dated October 20, 1868.

ATTACHMENT FOR SKATES.

The Schedule referred to in these Letters Patent and making part of the same.

*To all whom it may concern:*

Be it known that I, F. T. THURSTON, of Providence, in the county of Providence, and State of Rhode Island, have invented a new Attachment to Ice-Skates, to adapt them to use upon snow; and I do hereby declare that the following is a full, clear, and exact description thereof, reference being had to the accompanying drawings, and to the letters of reference marked thereon.

Figures 1 and 2 represent the two classes of single and double-runner skates, as used for ice.

Figures 3, 4, and 5 show how these classes of skates may be so modified that they may be used upon snow.

Figures 6, 7, and 8 show my attachment, designed to be applied to the ice-skates, to convert them into snow-skates.

Figures 9, 10, and 11 show these attachments fitted to their appropriate skates.

The remaining figures, 12 to 33 inclusive, show the methods I employ to fasten these attachments to the ice-skates.

The nature of my invention consists in the use of a flat strip of metal, bent to the curve of the bottom of the skate, and, as a protection to edge and bottom of the skate against injury by contact with the metal of this strip or shoe, having interposed between them some elastic material which would advantageously be cemented to the snow-shoe.

The width of the shoe I make as much wider than the bottom of the ice-skates as shall give a bearing-surface sufficient, when used upon trodden snow, to prevent sinking, and thus permit skaters to glide over its surface.

It is apparent that, to adapt any of the forms of skates now in use for ice, for service upon snow, it is only needful that their bottoms should be widened, to give broader bearing surface upon the softer material.

Thus, the bottom of the single-runner skate shown in fig. 1 may take the forms shown in figs. 3 and 5. The double-runner, shown in section in fig. 2, would have the bottom of its runners connected as in fig. 4.

The width to which the bottoms of these runners might be increased without assuming the forms of snow-skates above mentioned, might be a matter of dispute; but it is not the intention of the inventor to bring up this question, but to confine himself to a separate attachment, to be applied to ice-skates for the purpose specified.

The general form of this attachment is seen, in figs. 6 and 7, to consist simply of a strip of metal, A, wider than the bottom of the ice-skate, having cemented to it a strap of some elastic material, upon which the bottom of the ice-skate may bear without injury.

The width of this metallic shoe, of course, depends upon the hardness of the snow. For the snow on a well-trod walk or street, three-eighths of an inch would be sufficient, and might be assumed as a safe average, to be increased or diminished, according to circumstances.

Fig. 9 shows a single-runner skate, bearing upon its attached shoe, A, and in fig. 11 is likewise shown, attached, the shoe for a double-runner.

In some cases the space between these double-runners is considerable, in which case it will be better to form a metal shoe, B, fig. 8, to fill the space, as is shown in fig. 10.

The essential feature of my invention consists in the use of these metallic shoes, A and B, with the protecting-strips *a*.

The methods by which they may be attached to the skate-runner may of course greatly vary, determined, in many instances, by peculiarities of the skates. I have, in the accompanying drawings, shown those which would most readily be suggested.

In fig. 12 the mode of attachment consists in bending over the end *b* of the snow-skate to embrace the heel of the skate-iron, using projections, *c c*, to prevent lateral motion to the shoe, and finally securing by a pin or screw, *e*, passing through the skate-iron, and a web, *d*, projecting from the shoe.

Figs. 13 and 14 are respectively front and end views of the same.

Another method may consist in the use of the lugs *f f*, projecting upward from shoe, and thus secured by pins, screws, or set-screws, to the skate-iron.

Fig. 16 shows the position of the lug between the irons for a double-runner skate, and fig. 17 shows the lugs outside for a single-runner skate.

In figs. 26 and 27 is shown another method of holding these projecting lugs *f f*.

Slots *g* are cut into the lugs and into the adjacent parts of skate-irons, into which the keys *h* are inserted. While in this manner preventing the shoe from dropping from the runner, there is still no chance of the shoes slipping, for its upward curve at the front prevents any backward movement, and the bend *b* at the heel (see fig. 15) prevents any forward movement.

Still another method is shown in fig. 18.

Projections, shaped as *j*, are raised from the shoe, the horizontal arm of which reaches over and bears upon pins *i i*, which pass through the skate-iron, and thus the dropping of the shoe is prevented.

The simplest way of preventing the skate from slipping back upon the shoe would be to put in a holding-pin, *k*, in front of the projection *j*, or the snow-shoe being made enough longer than the skate-iron to allow of a sufficient forward movement to free the projection *j* from the pin *i*. The space between the bend *b* of the shoe and heel of skate-iron can be filled by the piece, *m*. The back-slip of the skate-iron will be thus prevented.

Fig. 19 shows the projections *j j* outside of iron, for a single-runner, and in fig. 21, between the irons, for a double-runner skate.

It will generally be deemed advantageous to make the pins $i$ $i$ in the form shown in fig. 20, for a single-runner, and in fig. 22, for a double-runner.

From the construction there shown, it will readily be seen that, while immovable while the snow-shoe is upon the skate, when the shoe is to be removed and the projections $j$ moved longitudinally from these pins, they can be taken from the holes, instead of leaving them as unsightly appendages to the skate.

Thus far the illustrations given apply to solid irons; but it is obvious that they apply equally well to the form shown in fig. 23.

In fig. 24 is given a method, especially adapted to this last-mentioned class of skates. It is similar to that explained in connection with figs. 26 and 27.

Instead of using two keys, as in those figures, but one is used, which enters the slots of both lugs, the lower face of key bearing upon the top of the skate-iron. The skate and shoe are thus held snugly together.

The mode of prevention of any longitudinal slip has been explained in connection with fig. 26.

Thus far, to avoid confusion, the single skate-iron has been considered as having its two sides parallel. In the majority of cases it is as shown in figs. 27 to 30, inclusive. The bottom being broader than the top, the lugs that project from the snow-shoe must not be at any point narrower than the bottom of the runner, or else the shoe could not be put on. The taper of the skate-iron will thus leave a space, $n$ $n$, between it and the lugs. To prevent, therefore, any rocking motion of the skate-iron in the shoe, there must be points of contact between them.

This may be accomplished by projections $p$ $p$, fig. 28, in any form, from the side of the skate-iron, or by washers, where holding-pins are used.

When the pin $i$, fig. 29, is used, this will be accomplished by having the pin fixed.

There is still another class of skates, represented by the two examples given in figs. 32 and 33, where the skate-iron is jointed, to permit of the bending of the foot.

In such cases, the two parts that form the runner would each be furnished with a shoe, attached in any of the above-mentioned ways.

There is one more point in this invention to be considered.

Unless provision is made to protect from such injury, the edge of that portion of the runner near, or enclosed by lugs, would bear against the latter and become dulled. As a preventive, a groove is cut in the lugs opposite and parallel with the edge of the skate, so that there will be no possibility of contact between them. This groove is referred to by letter $r$ in the sectional figures of annexed drawings.

A diligent search of records of Patent Office convinces me that the invention herein described is new, and in thus greatly adding to the opportunities and times in which the delightful and healthy recreation of skating may be enjoyed, it is believed to be useful.

Although a variety of methods of attaching the snow-shoe to the skate-iron have been above described, it is not to be understood that any special importance is placed upon any given mode, the essential point being the use of the shoe A or B, with the strip $a$ as a protection to the skate-iron; therefore,

What I claim as my invention, and desire to secure by Letters Patent, is—

The shoe A, or B, with the protecting strip $a$, constructed substantially in the manner described, for the purpose specified, irrespective of the method employed to secure its attachment to the skate.

F. T. THURSTON.

Witnesses:
    BENJAMIN LEWIS,
    ROBERT H. BLANDING.